(12) United States Patent
Bekker (10) Patent No.: US 7,076,159 B2
(45) Date of Patent: Jul. 11, 2006

(54) METHOD AND APPARATUS FOR GENERATING ACCURATE FAN TACHOMETER READINGS

(75) Inventor: Len Bekker, Central Islip, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 504 days.

(21) Appl. No.: 10/637,468

(22) Filed: Aug. 8, 2003

(65) Prior Publication Data

US 2005/0040777 A1 Feb. 24, 2005

(51) Int. Cl.
*H02P 5/00* (2006.01)

(52) U.S. Cl. .............. 388/800; 388/804; 388/811; 318/599; 318/811; 318/432

(58) Field of Classification Search ............. 318/599, 318/811, 254, 439, 138, 432, 434; 388/800, 388/804, 806, 811, 819
See application file for complete search history.

(56) References Cited

U.S. PATENT DOCUMENTS

| 4,722,669 | A | 2/1988 | Kundert |
| 4,727,468 | A | 2/1988 | Maekawa |
| 5,249,741 | A | 10/1993 | Bistline et al. |
| 5,307,439 | A | 4/1994 | Enami |
| 5,687,079 | A | 11/1997 | Bauer et al. |
| 5,727,928 | A | 3/1998 | Brown |
| 5,825,972 | A | 10/1998 | Brown |
| 5,942,866 | A | 8/1999 | Hsieh |
| 5,962,933 | A | 10/1999 | Henderson et al. |
| 5,990,582 | A | 11/1999 | Henderson et al. |
| 6,049,471 | A | * 4/2000 | Korcharz et al. ............. 363/20 |
| 6,101,106 | A | * 8/2000 | Shi ............................ 363/41 |
| 6,182,902 | B1 | 2/2001 | Shih |
| 6,188,189 | B1 | * 2/2001 | Blake ........................ 318/471 |
| 6,208,538 | B1 | 3/2001 | Halamik et al. |
| 6,226,324 | B1 | 5/2001 | Allstrom |

(Continued)

OTHER PUBLICATIONS

Marando et al., U.S. Appl. No. 10/459,169 entitled "Programmable PWM Stretching for Tachometer Measurement", filed on Jun. 11, 2003.

(Continued)

*Primary Examiner*—Rina Duda
(74) *Attorney, Agent, or Firm*—Meyertons Hood Kivlin Kowert & Goetzel, P.C.; Jeffrey C. Hood (57) ABSTRACT

A system and method for measuring the speed of a fan in an electrical system is presented. The duty cycle of a pulse width modulated (PWM) signal provided by a signal generator may control the speed of the fan. The fan may generate tachometer pulses that may be used by a tachometer reading-unit to monitor the RPM of the fan. Very low frequency test (VLFT) pulses may be generated and provided through a sampling signal multiplexed with the PWM signal to sample the fan generated tachometer pulses even when the PWM signal is low. The frequency of the sampling signal may be determined based on the duty cycle of the PWM signal and may be dynamically updated when the duty cycle of the PWM signal is updated. The sampling signal may be used as the clock input to a flip-flop with the tachometer pulses as the data input, and the output of the flip-flop providing an input to a pulse counter that counts the number of pulses within a determined period of time, providing as its output the measured RPM of the fan.

52 Claims, 4 Drawing Sheets

U.S. PATENT DOCUMENTS

| | | |
|---|---|---|
| 6,247,898 B1 | 6/2001 | Henderson et al. |
| 6,259,172 B1 * | 7/2001 | Lee .......................... 307/125 |
| 6,262,549 B1 | 7/2001 | Yang et al. |
| 6,285,146 B1 * | 9/2001 | Harlan ....................... 318/254 |
| 6,519,167 B1 | 2/2003 | Nguyen |
| 6,528,987 B1 | 3/2003 | Blake et al. |
| 6,563,284 B1 | 5/2003 | Teutsch et al. |
| 6,601,168 B1 | 7/2003 | Stancil et al. |
| 6,650,074 B1 | 11/2003 | Vyssotski et al. |
| 6,661,679 B1 | 12/2003 | Yang et al. |
| 2003/0193307 A1 | 10/2003 | Burstein |
| 2004/0001542 A1 | 1/2004 | Miller, Jr. |

OTHER PUBLICATIONS

Analog Devices, Publication ADM1027, "dBCOOL™ Remote Thermal Controller and Voltage Monitor," 2003, 56 pages.

National Semiconductor Corporation, Publication LM63, "±1° C Accurate Remote Diode Digital Temperature Sensor with Integrated Fan Control," Feb. 2003, 28 pages.

Stephen Ohr, "Analog IC vendors find 'Intel Inside' a safe bet," Sep. 12, 2002, online at http://www.eetimes.com/story/OEG20020912S0026.

* cited by examiner

FIG. 1

| PWM Duty Cycle % (Pulses) | Fan Rotational Speed /Sec (RPS) | Tachometer Pulses Frequency (Hz) | Tachometer Pulse Width (50% Duty) mS | Min Sampling Frequency (MSF) Hz |
|---|---|---|---|---|
| 6% (16) | No rotation | - | | - |
| 9% (24) | 10 | 20 | 25 | 40 |
| 12% (32) | 18 | 36 | 14 | 72 |
| 19% (48) | 28 | 56 | 9 | 112 |
| 25% (64) | 37 | 74 | 7 | 148 |
| 37% (96) | 50 | 100 | 5 | 200 |
| 50% (128) | 60 | 120 | 4 | 240 |
| 75% (192) | 74 | 148 | 3.4 | 296 |
| 100% (255) | 86 | 172 | 2.9 | 344 |

METHOD AND APPARATUS FOR GENERATING ACCURATE FAN TACHOMETER READINGS

BACKGROUND OF THE INVENTION

1. Field of the Invention

This invention relates to cooling equipment for electronic systems, e.g., fans, and more particularly, to controlling the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fans often include a tachometer output that provides a signal indicative of the current speed of the fan. The tachometer signal may be used to determine whether the fan is operating properly. Often, fans used for CPU and/or computer system cooling have a three-wire interface with wires for power, ground, and the tachometer signal. Fan drive systems often use a signal generator that provides a Pulse Width Modulated (PWM) signal to drive an external circuit that controls the voltage between the power and ground interfaces of the fan, which in turn controls the speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train currently being provided to the fan determines the fan's speed.

One problem associated with using signal generators that provide PWM signals to drive fan circuits is that the tachometer circuitry associated with the fan does not receive power during the time the fan is turned off between the PWM pulses. As a result, the tachometer signal output by the fan may not accurately represent the current fan speed during the time between pulses. Similarly, once the fan is turned off, the tachometer signal does not indicate the speed of the fan as the fan spins down. One technique that is currently used to measure fan speed in these situations involves using an analog filtering system to measure the back Electromotive Force (EMF) inserted into the fan tachometer signal by the rotating fan. Another problem associated with using signal generators that provide PWM signals to drive fan circuits is that multiple cooling zones create the need for multiple sensors and multiple fans, thereby causing the need for complex management schemes in fan operation management.

One digital technique used for measuring fan speed includes stretching the PWM signal pulse to insure that a valid tachometer signal remains asserted until the speed of the fan has been determined in case the duty cycle of the PWM signal would not permit such a measurement. There are, however, disadvantages associated with such techniques, including low accuracy, especially at low PWM duty cycles, fan speed surges resulting directly from stretching the PWM pulse and unwanted fan noise resulting from the fan speed surges. Another drawback is that the stretching typically dominates at low PWM duty cycles. In other words, the fan's speed, which is measured in revolutions-per-minute (RPM), is effectively controlled by the stretching of the PWM pulse and not by the duty cycle itself of the PWM signal. Such techniques generally lead to complicated implementations with significant impact on die size, and are typically prone to electrical noise sensitivity.

Many other problems and disadvantages of the prior art will become apparent to one skilled in the art after comparing such prior art with the present invention as described herein.

SUMMARY OF THE INVENTION

In one set of embodiments, the invention comprises a system and method for measuring and controlling the speed of a fan. The fan may be a breakable-ground-controlled fan in an electrical system. A breakable-ground-controlled fan is a fan which may have its power terminal uninterruptedly tied to a supply voltage, while on/off switching of the fan is achieved through connecting/disconnecting the fan's ground terminal to/from ground. In one embodiment, the duty cycle of a PWM signal provided by a signal generator output controls the speed of the fan, while a tachometer reading-unit monitors the revolutions per minute (RPM) of the fan. Instead of driving the fan directly, the PWM signal may switch a fan driver circuit, which may provide adequate power to spin the fan. In one embodiment, the fan generates a tachometer signal comprising tachometer pulses (also referred to as a fan pulses) that are used by the tachometer reading-unit to measure the RPM of the fan.

Very low frequency test (VLFT) pulses may be generated and provided through a sampling signal multiplexed with the PWM signal to sample the fan generated tachometer pulses. The VLFT pulses of the sampling signal may operate to determine if the tachometer signal reaching the tachometer reading-unit is high or low. The VLFT pulses may ensure that tachometer pulses that may be generated by the fan are available even when the PWM signal is low. This essentially operates to "recreate" the tachometer pulses. The thus recreated tachometer pulses may have variable width since the fan and VLFT pulses of the sampling signal may for the most part be asynchronous with respect to each other, although the number of tachometer pulses for a period of time will be commensurate with the actual fan rotation. In one embodiment, the frequency of the sampling signal (which comprises the VLFT pulses) is selected to be at least twice the highest attainable frequency of the fan generated tachometer pulses, per Nyquist's sampling theorem. In some embodiments the speed of the fan may not increase, though it may decrease, due to causes other than the PWM signal generator. In such embodiments the highest attainable frequency of the fan generated tachometer pulses may be reached when the PWM duty cycle is 100%, and the frequency of the sampling signal may also be adjusted as a function of the PWM duty cycle value.

In one set of embodiments, empirical data may be used to determine a number of different frequencies for the sampling signal, for instance five or six frequencies corresponding to PWM duty cycles of 9%, 12%, 25%, 50%, 75%, and 100% may be obtained. Furthermore, the frequencies may be automatically selected using the high bits of the duty cycle of the PWM signal, which may be stored in a duty cycle register. In one embodiment, the tachometer reading-unit includes a flip-flop with the sampling signal providing the VLFT pulses used as the clock input of the flip-flop, and the tachometer signal providing the tachometer pulses used as the data input of the flip-flop, where the output of the flip-flop is the recreated fan rotational pulses, (or recreated tachometer pulses). The recreated tachometer pulses may be the input to a counter that is gated (turned on) for a specific time, with the output of the counter providing the measured RPM of the fan. One advantage of the method described herein is a solution to the problem arising from the tachometer pulses not always being seen by the tachometer reading-unit due to the fan driver not propagating the tachometer pulses when the PWM signal is deasserted. This problem may be worse at low PWM duty cycles since the sample window can be narrower than the fan pulses. Embodiments of the present invention may provide a solution without requiring a stretching of PWM pulses, while counting a number of captured pulses generated by the fan, instead of counting an elapsed time period in-between pulses.

Thus, various embodiments of the systems and methods described above may facilitate design of a system to accurately measure and control the speed of a fan in an electrical system, while minimizing audio noise and sensitivity to electrical noise, and maintaining smooth fan operation.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. A "frequency" of pulses refers to a number of pulses that may appear within a selected unit period of time. For example, if twenty pulses appear within duration of one second, then the frequency of the pulses is 20 Hz.

When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port.

When referencing a pulse of a signal, a "leading edge" of the pulse is a first edge of the pulse, resulting from the value of the signal changing from a default value, and a "trailing edge" is a second edge of the pulse, resulting from the value of the signal returning to the default value. When data is said to be "registered" or "latched" "using" a signal, the signal acts as a trigger signal that controls the storing of the data into the register or latch. In other words, when a signal "used" for registering or latching data is in its triggering state, the data residing at respective input ports of the register or latch is stored into the register or latch. Similarly, when data is latched "on the leading edge" or "on the trailing edge" of a pulse of a clock, the data residing at respective input ports of a register or latch is stored into the register or latch, respectively, when a leading edge or a trailing edge of a pulse of the clock occurs, respectively.

Figure 1:
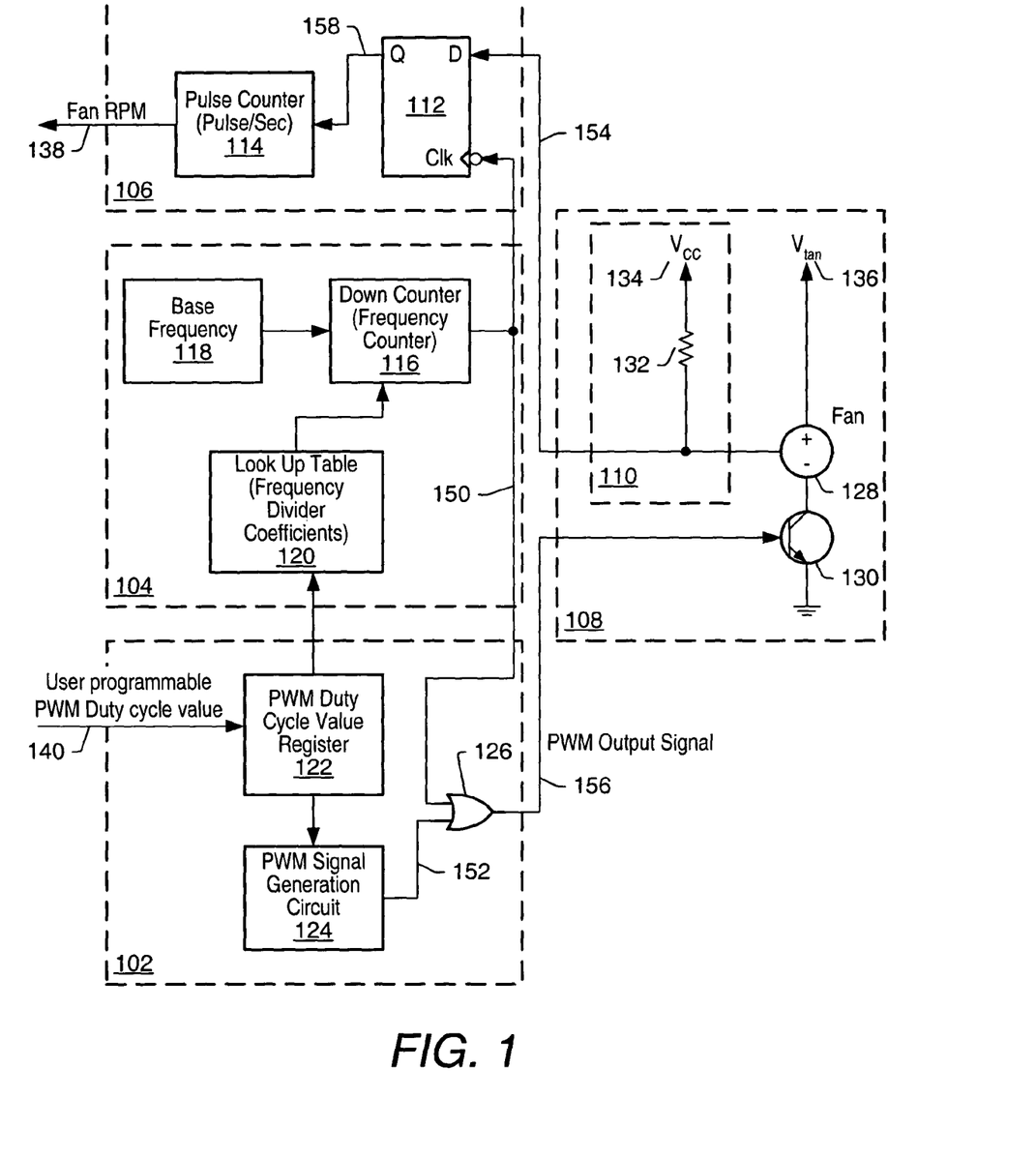
FIG. 1 illustrates one embodiment of a system to control the speed of a fan, implemented in accordance with the present invention.

FIG. 1 illustrates one embodiment of a system to measure the speed (or RPM) of a fan 128, implemented in accordance with the present invention. In this embodiment, the system includes a fan unit (FU) 108, a signal generator (SG) 102, a sampling circuit (SC) 104, and a tachometer reading-unit (TRU) 106. SC 104 may generate a sampling signal 150 which may be used by TRU 106 to count tachometer pulses generated by FU 108 and fed to TRU 106 through a tachometer signal 154. A sampling signal 150 may also be multiplexed with a PWM signal 152, which is generated by a PWM generation circuit 124 to control the speed of fan 128 that may be included in FU 108. In one embodiment, fan 128 is a 3-wire fan capable of generating tachometer pulses. Sampling signal 150 and PWM signal 152 may be provided as inputs to an OR gate 126, the output of OR gate 126 providing a combined PWM output 156 to FU 108. Fan 128 may be coupled to a fan supply voltage 136 and to the collector of a transistor 130 that may also be included in FU 108, with PWM output 156 coupled to the base of transistor 130, in effect controlling on/off switching of transistor 130. When transistor 130 is operating in an "on" mode, fan 128 may provide a determined number of tachometer pulses per revolution of fan 128. The tachometer pulses may be sent as the data input to a flip-flop 112 via tachometer signal 154 that comprises the tachometer pulses. In some embodiments, a conditioning circuit 110 that may also be included in FU 108 may process tachometer signal 154 prior to tachometer signal 154 being provided to flip-flop 112. In one embodiment, conditioning circuit 110 may include a pull-up resistor 132 coupled to a system supply voltage 134, while in other embodiments, conditioning circuit 110 may include other elements in addition to or in place of pull-up resistor 132.

A user programmable PWM duty cycle value 140 for PWM signal 152 may be programmed into PWM value register 122. The value of the duty cycle may be provided by register 122 to PWM generation circuit 124, which will correspondingly adjust the duty cycle of PWM signal 152, which in turn will result in the speed of fan 128 being adjusted accordingly. For example, at a PWM duty cycle value of 100%, fan 128 may reach a maximum RPM value, while a PWM duty cycle value of 50% would lower the speed of fan 128 from the maximum RPM value. PWM value register 122 may also provide the currently programmed PWM duty cycle value to a lookup table 120. In one embodiment, lookup table 120 holds divider coefficient values, which are provided to a down counter (or frequency counter) 116 for generating sampling signal 150 based on a base frequency 118 provided to down counter 116.

The divider coefficients for a particular fan may be determined from empirical data for various selected PWM duty cycle values for the fan. In order to obtain the divider coefficients for the fan, a set of PWM duty cycle values may first be selected, and rotational speed of the fan (revolutions per second) may be measured using an optical tachometer. A frequency for the tachometer signal that comprises the tachometer pulses generated by the fan may thus be determined, since the fan will generate a pre-determined number of tachometer pulses per revolution. A minimum frequency for the sampling signal may be selected such that quantization of the sampling may be equal or higher than quantization of the tested asynchronous sequence (that is, quantization of the tachometer pulses generated by the fan). Furthermore, Nyquist's sampling theorem may be applied, and the frequency for the sampling signal may be selected to be at least twice the tachometer signal frequency that corresponds to the selected PWM duty cycle value. Note that this analysis may be performed for any fan, including fan 128, which may be selected from a variety of available fans. Some fans may generate more tachometer pulses per revolution than others.

In one embodiment, lookup table 120 holds a set of divider coefficients corresponding to respective PWM duty cycle values for fan 128, such that an appropriate frequency for sampling signal 150 may be generated from base frequency 118. In alternate embodiments, lookup table 120 may hold multiple sets of frequency divider coefficient values, each set of frequency divider coefficient values corresponding to a particular fan and to the set of PWM duty cycle values associated with the particular fan. The PWM duty cycle values may be selected based on what expected PWM duty cycle values might be programmed into register 122 during system operation. In a preferred embodiment, every time a new PWM duty cycle value is programmed into register 122, a corresponding divider coefficient is selected from lookup table 120 and provided to down counter 116, resulting in sampling signal 150 being generated at a frequency corresponding to the currently used PWM duty cycle.

Figure 2:
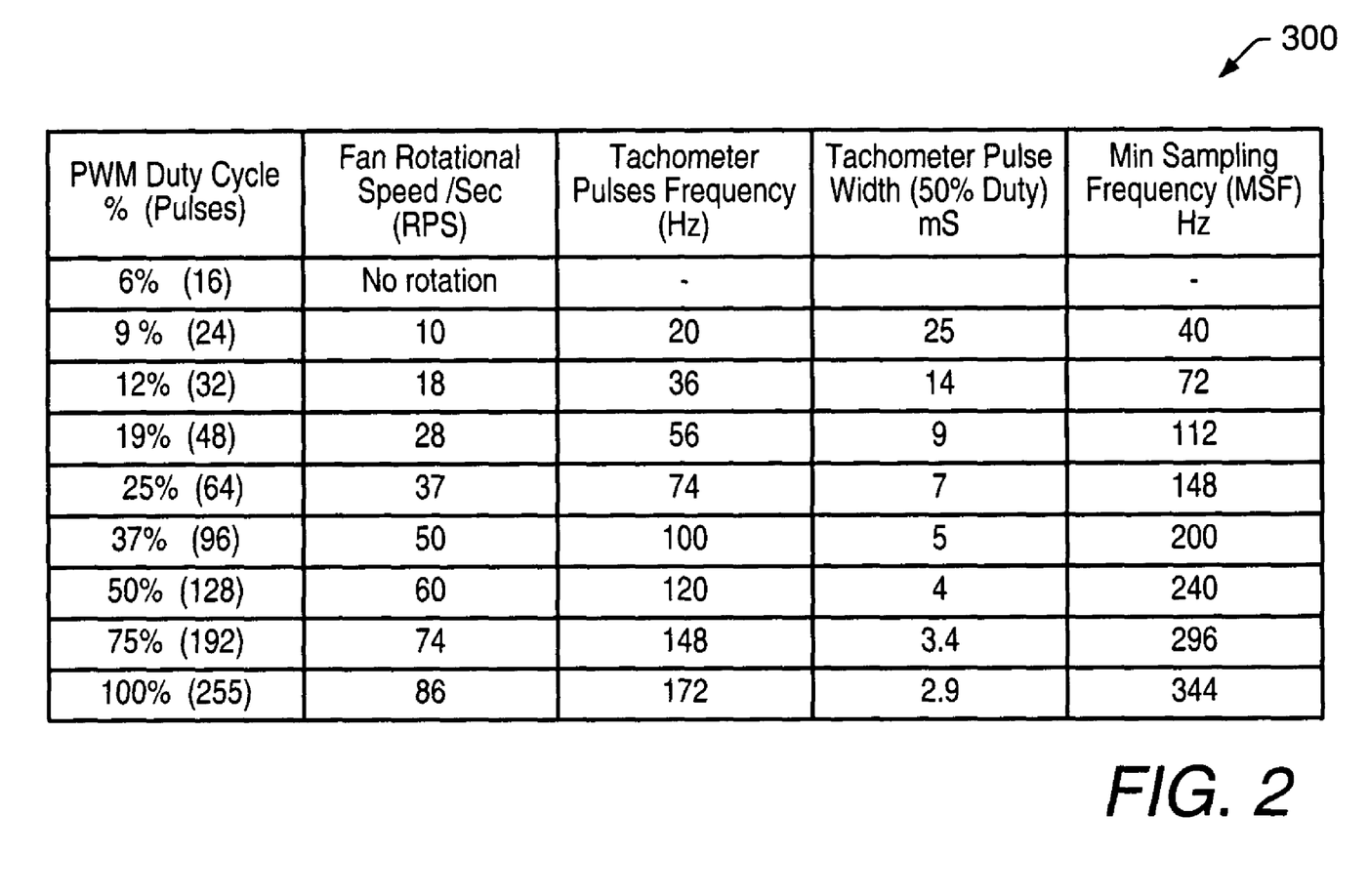
FIG. 2 illustrates a table showing a relationship between PWM duty cycle values and corresponding sampling signal frequencies, according to one embodiment of the present invention.

Table 300 in FIG. 2 illustrates one set of possible PWM duty cycle values for PWM signal 152 and corresponding frequency values for sampling signal 150. In this example, fan 128 is a fast fan that generates 2 tachometer pulses per revolution and has an RPM of around 6000 at a PWM duty cycle value of 100%. Column one of table 300 includes the PWM duty cycle percentage values with a corresponding number of pulses in parentheses. The fan rotational speed (measured in revolutions per second) for each PWM duty cycle value is shown in column two of table 300, with a corresponding tachometer pulse frequency for each rotational speed value in column three. For each tachometer frequency value a corresponding tachometer pulse width (at 50% duty cycle) measured in milliseconds is shown in column four, with column five containing the minimum frequencies (in Hz) that are to be used when generating sampling signal 150 for the corresponding PWM duty cycle value. Note that the frequency values in column five are multiples of two of the corresponding frequency values in column 3, reflecting the use of Nyquist's sampling theorem when selecting the appropriate frequency for sampling signal 152. Other tables similar to table 300 may be created for different fans and different selections for the duty cycle values of PWM signal 152. It will be evident to those skilled in the art that this method is in no way limited to the values used in the example of table 300.

It should also be noted that an embodiment such as shown in FIG. 1 may also be used to obtain the divider coefficients for fan 128 by selecting the frequency of sampling signal 150 to be at least twice the frequency of tachometer signal 154 obtained at a PWM duty cycle of 100%. The thus selected frequency of sampling signal 150 will be sufficiently high to accurately measure the rotational speed of fan 128 for any selected PWM duty cycle value, and the individual minimum frequency of sampling signal 150 for each corresponding PWM duty cycle value may be determined using the frequency of tachometer signal 154 at the corresponding PWM duty cycle value, and Nyquist's sampling theorem as previously described.

In one embodiment, sampling signal 150 operates to obtain tachometer pulses from fan 128 even during time periods when PWM signal 152 might be unasserted. By multiplexing sampling signal 150 with PWM signal 152 using OR gate 126, and using the resultant output from OR gate 126 as PWM output 156 provided to FU 108, tachometer pulses may be obtained every time a pulse is present in sampling signal 152. By selecting the frequency of sampling signal 150 as previously described, all necessary tachometer pulses—of the appropriate width—may be recreated. This in turn may allow counting the tachometer pulses for a determined period of time, thus obtaining the RPM of fan 128. The count may be achieved by using tachometer signal 154 as the data input into flip-flop 112 and clocking flip-flop 112 using sampling signal 150, which results in flip-flop 112 outputting recreated tachometer pulses via a recreated tachometer signal 158. The recreated tachometer pulses may then be provided to pulse counter 114, and the output of counter 114 will be fan RPM value 138. In some systems, fan RPM value 138 may be used as a feedback signal to determine if the speed of fan 128 needs to be altered, which may be accomplished by reprogramming PWM register 122 with an appropriate PWM duty cycle value as warranted by the current status of the system.

Figure 3:
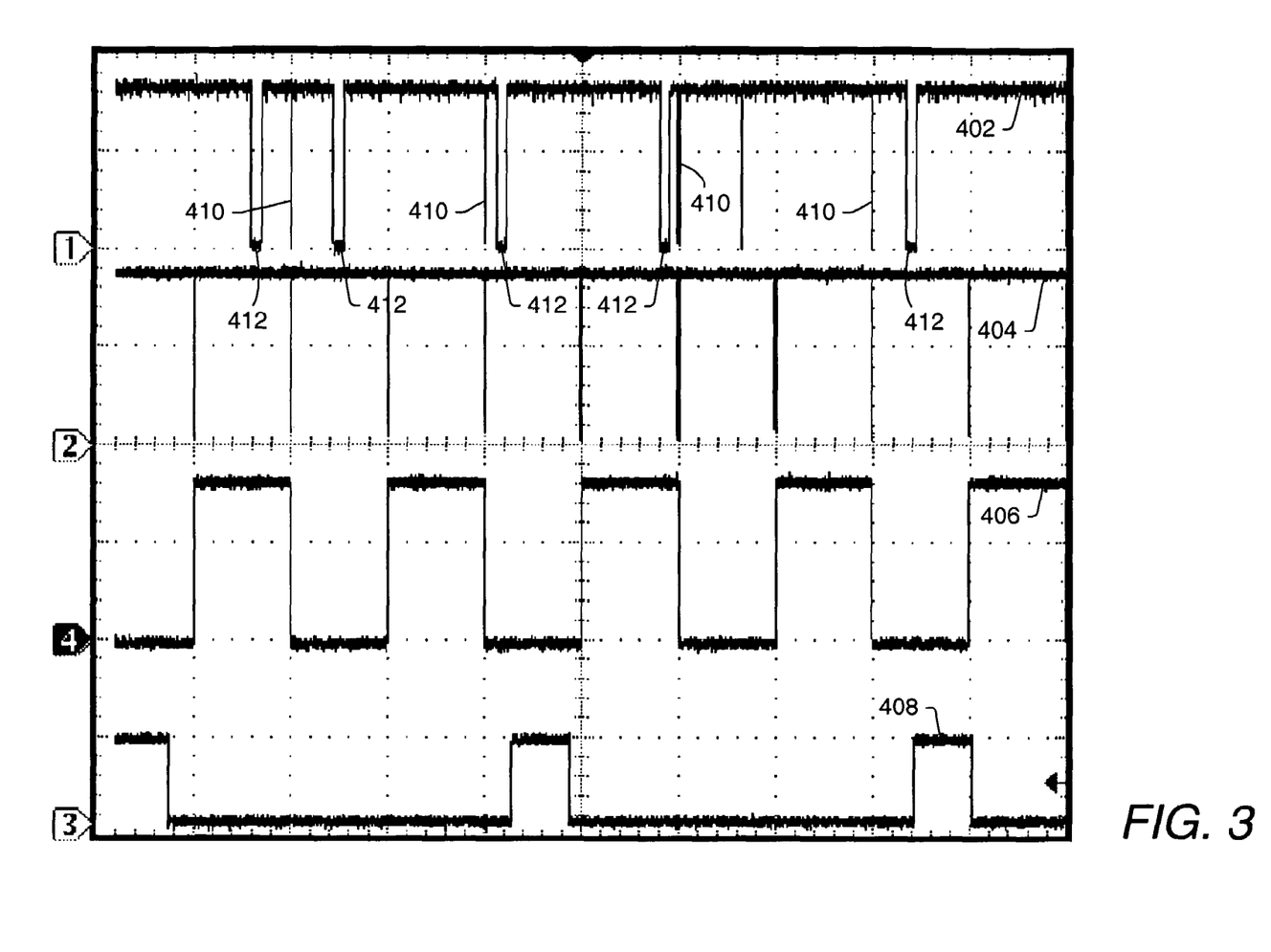
FIG. 3 illustrates a timing diagram of one example of a tachometer signal, a sampling signal, and a recreated tachometer signal, according to one embodiment of the present invention.

FIG. 3 illustrates a timing diagram of one example of tachometer signal 154, sampling signal 150, and recreated tachometer signal 158. In the example illustrated in FIG. 3, a PWM duty cycle of 12.5% is used, and fan 128 is assumed to generate 2 pulses per revolution. Waveform 402 represents tachometer signal 154, waveform 404 represents sampling signal 150, and waveform 406 represents recreated tachometer signal 158. As shown in FIG. 3, each pulse in waveform 404 samples the current value of waveform 402. This illustrates sampling signal 150 acting as the clock for flip-flop 112, with tachometer signal 154 provided as the data input of flip-flop 112. The output of flip-flop 112 represented by waveform 406 illustrates the recreated tachometer pulses present in recreated tachometer signal 158. As a result of applying sampling signal 150 to FU 108, additional pulses 410 appear in-between pulses 412 present during PWM signal 152 being asserted. Additional pulses 410 result in recreation of uninterrupted tachometer pulses shown in waveform 406, corresponding to the recreated tachometer pulses present in recreated tachometer signal 158. For a PWM duty cycle value higher than 12.5% the respective frequency of waveforms 402, 404, and 406 may also increase, and similarly for a PWM duty cycle value lower than 12.5%, the respective frequencies of waveforms 402, 404, and 406 may decrease. Waveform 408 shows an optical reference tachometer signal representing a single pulse per revolution, used as a base reference.

Figure 4:
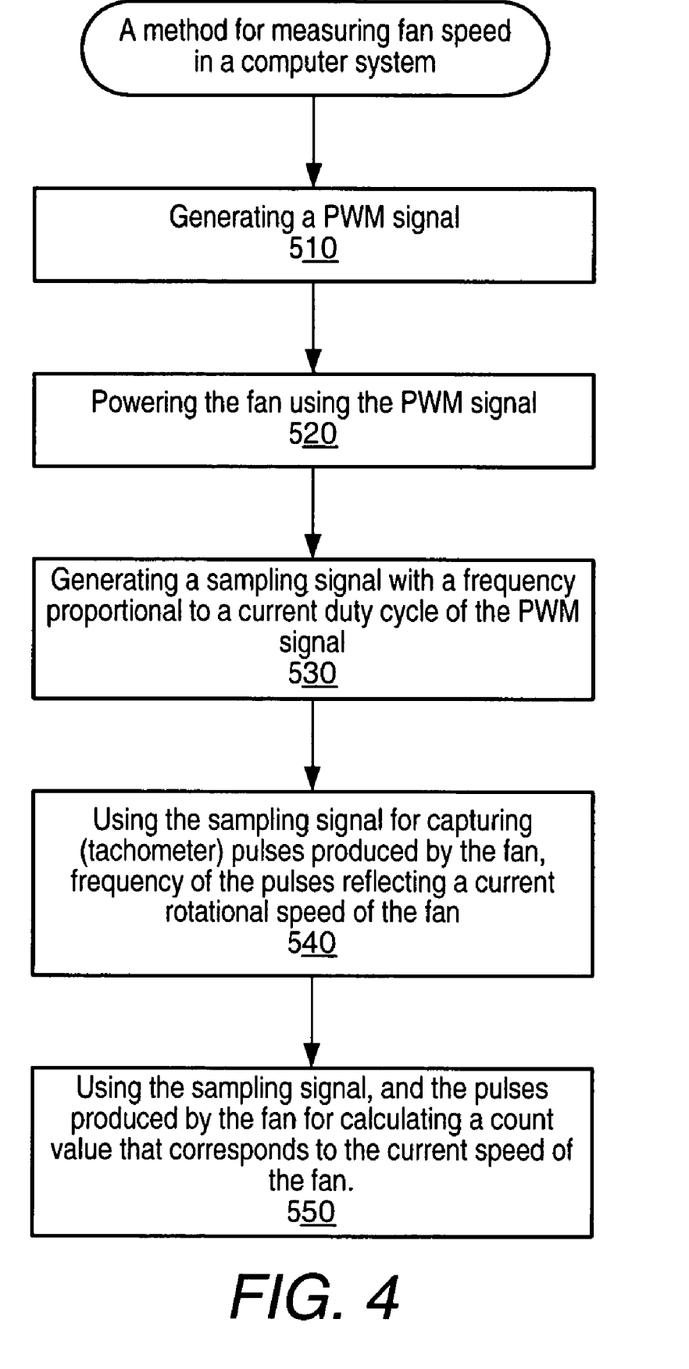
FIG. 4 illustrates a flowchart of one embodiment of a method to control and measure the speed of a fan, in accordance with the present invention.

FIG. 4 illustrates a flowchart of one embodiment of a method to control and measure the speed of a fan. A PWM signal may be generated (510) and used for powering a fan (520). Duty cycle value of the PWM signal may be user programmable and may be changed during system operation as required, based on the temperature of the system to alter speed of the fan. In one embodiment, a sampling signal with a frequency corresponding to the current duty cycle of the PWM signal is generated (530), and is subsequently used to capture (tachometer) pulses generated by the fan (540). In some embodiments the frequency of the sampling signal may be generated as a function of the current duty cycle of the PWM signal. In other embodiments the frequency of the sampling signal may represent a frequency that is at least twice the highest frequency of the fan generated tachometer pulses. The frequency of the pulses generated by the fan may reflect a current rotational speed of the fan. The sampling signal may be used to obtain pulses from the fan even when the PWM signal is in a deasserted state. The sampling signal may then be used to capture the pulses to calculate a count value that corresponds to the current speed of the fan (550). In one embodiment, the sampling signal may be combined with the PWM signal in such a manner that pulses provided by the sampling signal may briefly power the fan even when the PWM signal might be deasserted. In this embodiment, the sampling signal is also used as the clock input of a flip-flop, with the fan generated tachometer pulses provided as data input to the flip-flop. Thus, the output of the flip-flop may be a signal providing reconstructed tachometer pulses, which may be counted by a counter during a determined period of time, the output of the counter providing a count value that corresponds to the current measured speed of the fan, or RPM value of the fan.

It should be noted that while in a preferred embodiment sampling signal 150 is used for sampling tachometer signal 154, in alternate embodiments sampling signal 150 may be used to reset a flip-flop and a time interval counter with an expiration time that is ten to twenty percent longer than a period of sampling signal 150. In such a case, when tachometer pulses that are not visible (due to PWM signal 152 being deasserted) are present, the following may occur:

1. Negative sampling signal 150 pulses may appear in tachometer signal 154, and may reset the time interval counter and the flip-flop;
2. Noise spikes, which may typically occur for tachometer pulses that are not visible being low, may reset the time interval counter and the flip-flop; and
3. Tachometer pulses may become visible if PWM signal 152 becomes asserted, and may reset the time interval counter and the flip-flop.

When tachometer pulses are not present, regardless of whether PWM signal 152 may be asserted, none of the mentioned events would occur, and the time interval counter may issue a carry upon expiration of the time interval. This carry may set the flip-flop. The next tachometer pulse may reset the flip-flop and the time-interval counter. As a result, the flip-flop may issue a pulse every time a tachometer pulse is detected. The signal issued by the flip-flop may be input to a pulse counter, which may count for a determined period of time, with the resulting count value corresponding to the RPM of the fan.

Thus, various embodiments of the systems and methods described above may facilitate design of a tachometer system to accurately measure and control the speed of a fan in an electrical system, while minimizing audio noise and sensitivity to electrical noise, and maintaining smooth fan operation.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system for determining speed of a fan powered by a power supply configured to provide a pulse width modulated (PWM) signal to the fan, wherein the fan is operable to generate fan pulses indicative of a current speed of the fan, the system comprising:
   a sampling circuit operable to generate sampling pulses and to provide the sampling pulses to the fan, wherein a current frequency of the sampling pulses is proportional to a current frequency of the fan pulses; and
   a reading unit configured to receive the sampling pulses and the fan pulses, and operable to generate a count value from the sampling pulses and the fan pulses, wherein the count value corresponds to the current speed of the fan;
   wherein the sampling pulses operate to provide power to the fan during operation of the reading unit reading the fan pulses from the fan.

2. The system of claim 1,
   wherein at least one respective sampling pulse of the sampling pulses is operable to power the fan when the respective sampling pulse is generated during a time when the PWM signal is deasserted, wherein the fan will remain powered for the duration of the respective sampling pulse.

3. The system of claim 2, wherein a duty cycle of the current frequency of the sampling pulses is substantially lower than 15%.

4. The system of claim 1, wherein the reading unit is operable to generate recreated fan pulses, wherein the count value is a number of recreated fan pulses obtained during a predetermined period of time.

5. The system of claim 1, wherein the reading unit comprises:
a latch configured to receive the sampling pulses as clock input and to receive the fan pulses as data input; and
a counter configured to receive output provided by the latch;
wherein the counter is operable to generate and to output the count value.

6. The system of claim 5, wherein the latch is a negative edge triggered flip-flop.

7. The system of claim 1;
wherein the sampling circuit is configured to receive a current duty cycle value of the PWM signal;
wherein the sampling circuit is further operable to determine the current frequency of the sampling pulses as a function of the current duty cycle value of the PWM signal.

8. The system of claim 1, wherein the sampling circuit comprises:
a lookup table configured to receive a current duty cycle value of the PWM signal, and operable to provide a divider coefficient value based on the current duty cycle value of the PWM signal;
a frequency down counter configured to receive the divider coefficient value and a base frequency value, and operable to generate the sampling pulses, wherein the current frequency of the sampling pulses is obtained from the base frequency value and the divider coefficient value.

9. The system of claim 1, wherein the current frequency of the sampling pulses is at least twice the current frequency of the fan pulses.

10. A system for measuring speed of a fan, wherein the fan is operable to generate fan pulses having a current frequency corresponding to a current speed of the fan, the system comprising:
a signal generator configured to provide a pulse width modulated (PWM) signal to the fan, wherein the PWM signal is operable to control the speed of the fan, and wherein a current duty cycle value of the PWM signal reflects a desired speed of the fan;
a sampling circuit operable to generate a sampling signal with a current frequency that is a function of the current duty cycle value of the PWM signal; and
a tachometer reading-unit configured to receive both the sampling signal and the fan pulses to generate a count value based on the fan pulses and the sampling signal, wherein the count value reflects the current speed of the fan;
wherein the sampling signal operates to provide power to the fan during operation of the tachometer reading-unit reading the fan pulses from the fan.

11. The system of claim 10;
wherein at least one respective sampling pulse comprised in the sampling signal is operable to power the fan when the respective sampling pulse is generated during a time when the PWM signal is deasserted, wherein the fan will remain powered for the duration of the respective sampling pulse.

12. The system of claim 10, wherein a duty cycle of the frequency of the sampling signal is substantially lower than 15%.

13. The system of claim 10, wherein the tachometer reading-unit is operable to generate recreated fan pulses, wherein the count value is a number of recreated fan pulses obtained during a predetermined period of time.

14. The system of claim 10, wherein the tachometer-reading unit comprises:
a latch configured to receive the sampling signal as clock input and to receive the fan pulses as data input; and
a counter configured to receive output provided by the latch;
wherein the counter is operable to generate and to output the count value.

15. The system of claim 14, wherein the latch is a negative edge triggered flip-flop.

16. The system of claim 10, wherein the current frequency of the sampling signal is at least twice the current frequency of the fan pulses.

17. The system of claim 1, wherein the sampling circuit comprises:
a lookup table configured to receive the current duty cycle value of the PWM signal, and operable to provide a divider coefficient value based on the current duty cycle value of the PWM signal;
a frequency down counter configured to receive the divider coefficient value and a base frequency value, and operable to generate the sampling pulses, wherein the current frequency of the sampling pulses is obtained from the base frequency value and the divider coefficient value.

18. A system for measuring speed of a fan in a system comprising a fan and a signal generator, wherein the fan is operable to generate fan pulses having a frequency corresponding to a current speed of the fan, wherein the signal generator is configured to provide a pulse width modulated (PWM) signal to the fan, wherein the PWM signal is operable to control the speed of the fan, and wherein a duty cycle value of the PWM signal reflects a desired speed of the fan, the system comprising:
a sampling circuit operable to generate a sampling signal with a frequency that is proportional to the duty cycle value of the PWM signal; and
a tachometer reading-unit configured to receive both the sampling signal and the fan pulses to generate a count value that reflects the current speed of the fan;
wherein the sampling signal operates to provide power to the fan during operation of the tachometer reading-unit reading the fan pulses from the fan.

19. A system comprising:
a fan operable to generate fan pulses having a frequency corresponding to a current speed of the fan;
a signal generator configured to provide a pulse width modulated (PWM) signal to the fan, wherein the PWM signal is operable to control the speed of the fan, and wherein a duty cycle value of the PWM signal reflects a desired speed of the fan;
a sampling circuit operable to generate a sampling signal with a frequency that is proportional to the duty cycle value of the PWM signal; and
a tachometer reading-unit configured to receive both the sampling signal and the fan pulses to generate a count value that reflects the current speed of the fan;
wherein the count value is usable to adjust the duty cycle of the PWM signal.

20. The system of claim 19, wherein the sampling circuit is operable to provide the sampling signal to the fan, and wherein the fan is further operable to generate a fan pulse based on a current rotational state of the fan in response to a sampling signal pulse in the sampling signal.

21. The system of claim 19, wherein the fan speed is rotational fan speed.

22. The system of claim 19, wherein the signal generator is operable to update the duty cycle of the PWM signal based on the count value.

23. The system of claim 19, wherein the signal generator is a PWM signal generator.

24. The system of claim 19, further comprising a duty cycle register configured to supply the sampling circuit with data specifying a number of pulses to create in the sampling signal for a given time period.

25. The system of claim 19, wherein the tachometer reading-unit is operable to generate recreated fan pulses based on the fan pulses sampled by the sampling signal in the tachometer reading-unit.

26. The system of claim 25 further comprising a counter operable to receive the recreated fan pulses and to generate the count value based on the recreated fan pulses.

27. The system of claim 19, wherein the frequency of the sampling signal is at least double a frequency of the fan pulses determined by the duty cycle value of the PWM signal.

28. The system of claim 19, wherein a count of the fan pulses corresponds to the current speed of the fan.

29. The system of claim 19, wherein the system is a fan-based cooling system for cooling an electronic device.

30. The system of claim 29, wherein the system is a computer cooling system.

31. A system comprising:
   a fan operable to generate fan pulses that correspond to a current rotational speed of the fan;
   a signal generator configured to provide a pulse width modulated (PWM) signal to the fan, wherein the PWM signal is operable to control the rotational speed of the fan, and wherein a duty cycle value of the PWM signal is configured to reflect a desired rotational speed of the fan;
   a sampling circuit operable to generate a sampling signal having pulses; and
   a tachometer reading-unit configured to receive both the sampling signal and the fan pulses;
   wherein the tachometer reading-unit is operable count a number of fan pulses for a determined period of time, and to generate a count value based on the number of fan pulses;
   wherein the count value reflects the current rotational speed of the fan; and
   wherein the count value is usable to adjust the duty cycle of the PWM signal.

32. The system of claim 31, wherein the sampling circuit is operable to provide the sampling signal to the fan, and wherein the fan is further operable to generate a fan pulse based on a current rotational state of the fan in response to a sampling signal pulse in the sampling signal.

33. The system of claim 31, wherein a frequency of the sampling signal is proportional to the duty cycle value of the PWM signal.

34. The system of claim 31, wherein the signal generator is operable to update the duty cycle of the PWM signal based on the count value.

35. The system of claim 31, wherein the signal generator is a PWM signal generator.

36. The system of claim 31, further comprising a duty cycle register configured to supply the sampling circuit with data specifying a number of pulses to create in the sampling signal for a given time period.

37. The system of claim 31, wherein the tachometer reading-unit is operable to generate recreated fan pulses based on the fan pulses sampled by the sampling signal in the tachometer reading-unit.

38. The system of claim 37, further comprising a counter operable to receive the recreated fan pulses and to generate the count value based on the recreated fan pulses.

39. The system of claim 31, wherein the frequency of the sampling signal is at least double a frequency of the fan pulses determined by the duty cycle value of the PWM signal.

40. The system of claim 31, wherein the system is a fan-based cooling system for cooling an electronic device.

41. The system of claim 31, wherein the system is a computer cooling system.

42. A method for measuring speed of a fan, the method comprising:
   generating a PWM signal to power the fan;
   generating a sampling signal, wherein the sampling signal has a current frequency that is proportional to a current duty cycle value of the PWM signal;
   producing fan pulses that reflect a current rotational speed of the fan;
   operating the sampling signal as a trigger signal to capture the fan pulses;
   counting a number of fan pulses during a determined period of time; and
   calculating a count value based on the number of fan pulses;
   wherein the count reflects the current speed of the fan.

43. The method of claim 42, further comprising:
   generating recreated fan pulses based on the fan pulses sampled by the sampling signal;
   wherein said counting the number of fan pulses comprises counting a number of recreated fan pulses.

44. The method of claim 42, wherein the current frequency of the sampling signal is at least twice a current frequency of the fan pulses.

45. A method for measuring speed of a fan powered by a power supply configured to provide a pulse width modulated (PWM) signal to the fan, wherein the fan is operable to generate a tachometer signal indicative of a current speed of the fan, the method comprising:
   generating a sampling signal, wherein a current frequency of the sampling signal is proportional to a current frequency of the tachometer signal;
   latching the tachometer signal using the sampling signal as a trigger signal;
   operating the sampling signal to provide power to the fan during said latching the tachometer signal;
   outputting a recreated tachometer signal; and
   calculating a count value based on the recreated tachometer signal, wherein the count reflects the current speed of the fan.

46. The method of claim 45, wherein in said operating the sampling signal at least one respective sampling pulse comprised in the sampling signal is operable to power the fan when the respective sampling pulse is generated during a time when the PWM signal is deasserted, wherein the fan will remain powered for the duration of the respective sampling pulse.

47. The method of claim 46, wherein a duty cycle of the current frequency of the sampling signal is substantially lower than 15%.

48. The method of claim 45;
wherein the recreated tachometer signal comprises recreated tachometer pulses;
wherein said calculating comprises counting a number of recreated tachometer pulses within a predetermined period of time;
wherein the count value is the number of recreated tachometer pulses counted within the predetermined period of time.

49. The system of claim 45, wherein in said latching a negative edge triggered latch is used.

50. The method of claim 45, wherein said generating the sampling signal comprises:

receiving a current duty cycle value of the PWM signal; and
determining the current frequency of the sampling signal as a function of the current duty cycle value of the PWM signal.

51. The method of claim 45, wherein said generating the sampling signal comprises:
providing a divider coefficient value based on the current duty cycle value of the PWM signal; and
dividing a base frequency by the divider coefficient value to obtain the current frequency of the sampling signal.

52. The method of claim 45, wherein the current frequency of the sampling signal is at least twice the current frequency of the tachometer signal.

* * * * *

UNITED STATES PATENT AND TRADEMARK OFFICE
CERTIFICATE OF CORRECTION

PATENT NO. : 7,076,159 B2 Page 1 of 1
APPLICATION NO. : 10/637468
DATED : July 11, 2006
INVENTOR(S) : Len Bekker It is certified that error appears in the above-identified patent and that said Letters Patent is hereby corrected as shown below:

<u>In the Claims:</u>

<u>Column 10</u>
Line 21, please delete "The system of claim 1" and substitute -- The system of claim 10 --;

<u>Column 11</u>
Line 47, please delete "is operable count a" and substitute -- is operable to count a --;

Signed and Sealed this

Fourteenth Day of November, 2006

JON W. DUDAS
*Director of the United States Patent and Trademark Office*